Patented Dec. 7, 1937

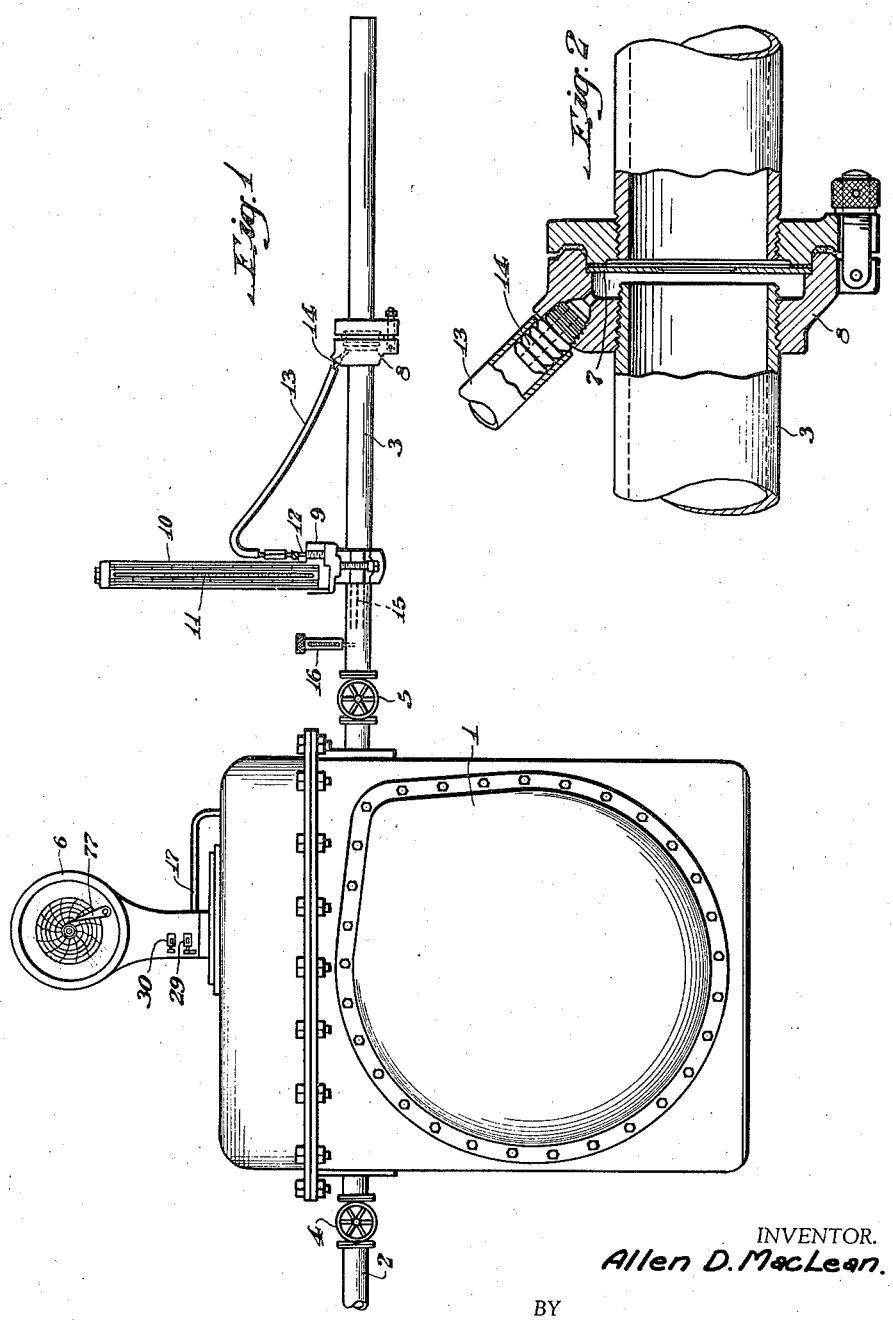

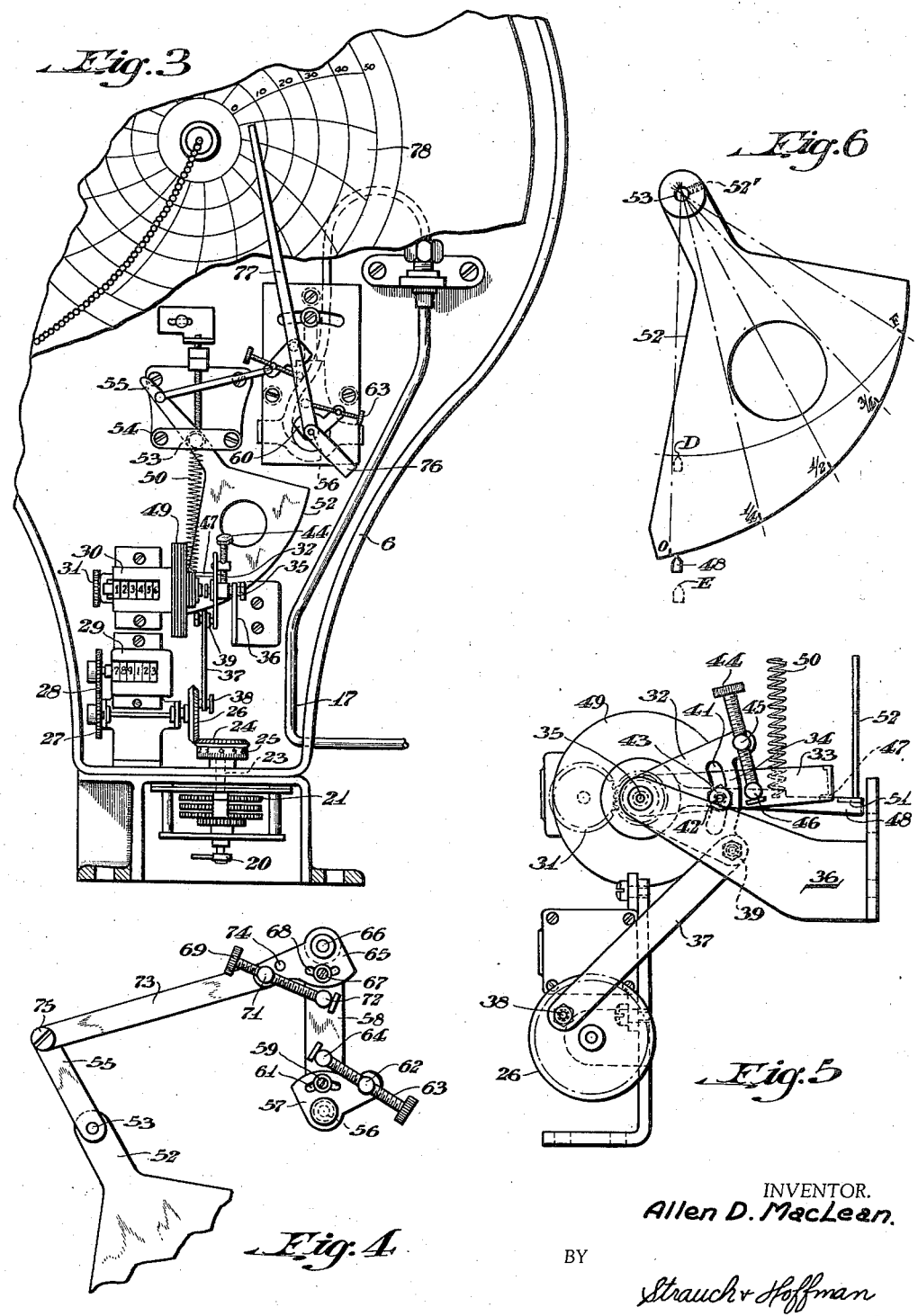

2,101,745

UNITED STATES PATENT OFFICE 2,101,745

METHOD AND APPARATUS FOR CALIBRATING AND PROVING METERS

Allen D. MacLean, Pittsburgh, Pa., assignor to Pittsburgh Equitable Meter Company, Pittsburgh, Pa., a corporation of Pennsylvania Application December 13, 1935, Serial No. 54,316

2 Claims. (Cl. 73—51)

This invention relates to apparatus and methods for calibrating a metering mechanism for directly and accurately registering the total volume of gas passing through the meter reduced to a given base pressure regardless of the actual pressure of the gas being measured.

In the usual type displacement meter the volume of gas passed through the meter is measured in volume units without taking into account the mass or density of the gas, which increases when the line pressure is increased and decreases with decrease in pressure. Where gas is sold in large volumes the price is based upon a definite pressure, known as the base pressure, and as often it is impracticable for the gas company to maintain a constant pressure in its lines, or a pressure as low as the base pressure, an ordinary displacement meter would not give a correct indication of the actual weight of gas passed therethrough.

An apparatus for correctly measuring the volume of gas reduced to a base pressure is described and claimed in the copending applications of MacLean and Niesemann, Serial No. 462,843 filed June 21, 1930, and of Allen D. MacLean, Serial No. 554,879 filed August 3, 1931. In this apparatus the displacement meter operates a pressure correcting device having an uncorrected volume counter, and a corrected volume counter driven through the medium of a cam member, and a static pressure element in the pressure correcting device causes the corrected counter to be driven at a rate varied automatically in accordance with the pressure of the gas measured by the displacement meter to register the volume reduced to the base pressure on the corrected volume counter. The present application relates to the methods and apparatus of calibrating and testing pressure correcting devices of this type.

In the field, it frequently is necessary to test not only the displacement meter but also the pressure correcting device associated therewith, and where the displacement meter is very large it is not convenient to remove the meter from the line to a laboratory for testing. Also, should the pressure correcting device be removed for any considerable period to be tested the gas flowing through the displacement meter will not be recorded properly. This invention therefore has for an object the provision of a process and apparatus for testing such pressure correcting devices in the field or laboratory in conjunction with a displacement meter, to determine the accuracy thereof and correct for errors in either the displacement meter or pressure correcting device.

This invention has for another object the provision of a method for testing a combined displacement meter and pressure correcting mechanism wherein gas is passed through a positive meter at its normal operating pressure, and the pressure of the gas discharging from the meter is reduced to or near the base pressure at which pressure its volume is computed from the indication of an accurate device, such as a flow prover, so that the reading of the pressure correcting mechanism can be directly compared to the corrected volume as determined from the flow prover.

Another object is the provision of an apparatus and method for testing displacement meters used in conjunction with a pressure correcting device whereby inaccuracies in the meter can be adjusted for in the adjustments of the pressure correcting device.

Another object of the present invention is the provision of apparatus and methods for testing or proving the pressure correcting device to determine its accuracy and of means to correct for deviations thereof.

These and various other objects of this invention will be apparent from the following description and the appended claims taken in connection with the accompanying drawings wherein:

Figure 1 is a side elevation view illustrating a preferred embodiment of the apparatus of this invention for testing a meter in conjunction with a pressure correcting device by a novel method herein disclosed;

Figure 2 is an enlarged vertical section view of the details of the orifice plate and fitting shown in Figure 1;

Figure 3 is a fragmentary elevation view showing a preferred type of pressure correcting device with the front of the case removed;

Figure 4 is a detail view showing the adjustment between the cam and pressure element;

Figure 5 is a detail view showing the arrangement for driving the volume corrected index from the uncorrected index, the cam being at its middle position; and Figure 6 is a partly diagrammatic view showing the cam and cooperating clutch arm, the cam being located at its base pressure position.

Referring to the drawings, a positive displacement meter 1 of any suitable construction has an inlet pipe 2 and an outlet pipe 3 connected therewith, a valve 4 being located on the inlet side for controlling the pressure of gas through the meter. A valve 5 located on the outlet side can be used to govern the pressure of gas in the pipe 3. A pressure correcting device 6 of any suitable construction is mounted on the meter case, and is adapted to be driven by the meter in any suitable manner, as for example, from the tangent arm thereof through a driving dog (not shown). An orifice plate 7 is removably secured in a suitable fitting 8 and permits flow therethrough, and a very accurate manometer gauge indicated generally by numeral 9 is secured on pipe 3 between the meter and orifice plate. The gauge 9 comprises a body 10 suitably clamped on the pipe 3, and a manometer tube 11 containing water or mercury is secured to the body. One end 12 of the tube 11 is connected by a rubber tube 13 to a nipple 14 which communicates with the pipe 3 on the advance side of orifice plate 7. Straightening vanes 15 in the pipe in advance of the orifice plate 7 eliminate turbulent flow. A thermometer 16 located in a suitable well in pipe 3 shows the temperature of the gas passing therethrough. The pressure element of pressure correcting device 6 is connected by a tube 17 to the gas chamber of the meter. The flow characteristics of the orifice plate have been previously determined, and by proper manipulation of valves 4 and 5 the pressure in pipe 3 can be maintained constant at the base pressure and this pressure will be indicated on the gauge 9.

In Figures 3 to 6 there is shown one type of pressure correcting meter indicated generally by the numeral 6 which in practical operation would be connected to a positive type displacement meter 1 (Figure 1) of any suitable type, and operated through a driven crank 20 connected through gearing 21 to cause rotation of the main drive shaft 23. A miter gear 24 is secured to the upper end of the main drive shaft and has a collar or cylindrical portion 25 upon which is marked a graduated scale. The miter gear 24 meshes with a similar miter gear 26 which, through gears 27 and 28, drives the volume counter 29. As the counter 29 is driven by the flow of gas through the displacement meter it will register directly the volume of gas flowing therethrough without regard to the pressure of the gas being measured.

A pressure compensated volume counter 30 is adapted to be driven from gear 26 of the uncorrected volume counter 29 by correcting means and the gearing 31. The correcting means for the corrected counter includes a pivoted lever 32 (Figure 5) made up of a driving arm 33 and a segment 34 which are relatively angularly adjustable, and are adapted to be secured together during operation. The lever 32 is pivoted about the stub shaft 35 on a bracket 36, and is adapted to be oscillated by the connecting link 37 swivelly secured at one end to a crank pin 38 on gear 26, and at its other end swivelly secured to a pin 39 secured on segment 34. The segment 34 has an arcuate slot 41 therein, and a screw 42 secured at one end to arm 33 extends therethrough. The segment 34 is clamped to the arm 33 by the nut 43 or any other suitable means. A fine adjustment between arm 33 and segment 34 can be secured by the threaded adjustment screw 44 which is threaded through the stub 45 on segment 34 and is swively connected to stub 46 on arm 33.

The arm 33 has a laterally projecting portion 47 at its end, and at a certain point in the downward stroke of lever 32 this projection is adapted to engage a clutch arm 48 which is connected to one portion of a one way clutch element 49 of suitable construction through which the pressure corrected volume counter 30 is driven in one direction only. This clutch element is described in detail in the application of Allen D. MacLean hereinbefore referred to. The extremity of arm 48 is cut out on its center line and the extension 47 engages this cut out portion. The end of the cut out portion has a knife edge 51. Clutch arm 48 is biased upward by spring 50 and the limit of upward movement of arm 48 is governed by engagement of knife edge 51 with the edge of pivoted cam 52, the position of which cam is adjusted by a suitable pressure responsive element 60 connected to the gas line on which the displacement meter is located. The projection 47 is oscillated about its pivot 35 in an angular path, the limits of which are fixed by the length of link 37 and the ratio of the radii of crank pins 38 and 39. Moreover, the path of projection 47 can be shifted angularly by the screw 44 about any desired part of its circle of movement so as to bring the downward limit of arm 33 to correspond to absolute zero pressure as will hereinafter appear. It therefore will be seen that the clutch operating stroke of arm 48 is determined by two elements one of which is manually set, namely, the downward limit of the stroke of arm 33, and the other of which is automatically adjusted by the pressure of the gas being measured, namely, the point of engagement of cam 52 and knife edge 51.

The cam 52 is mounted on a shaft 53 (Figures 3 and 4) by a collar having a set screw 52' therein, said shaft being pivotally secured in a suitable bracket 54, and an arm 55 is secured to shaft 53. The pressure element 60 which may be of the helical or Bourdon tube type is adapted to rotate shaft 56 (Figure 3 and 4) to which is secured the segment 57. Loosely pivoted about shaft 56 is a strap 58 carrying a set screw 59 projecting through a slot 61 in the segment 57. A lug 62 on an extension of segment 57 has an adjustment screw 63 threaded therein and at its end is swivelled to a similar lug 64 on strap 58. The angular relation between strap 58 and segment 57 can be adjusted by loosening set screw 59 and turning adjusting screw 63.

At the upper end of strap 58 a similar segment 65 is swivelled to strap 58 by a stub shaft 66 and a similar set screw 67 secured in strap 58 and extending through arcuate slot 68 in segment 65 is adapted to clamp these parts together. The angular adjustment of strap 58 and segment 65 is obtained by turning adjusting screw 69 which is threaded into stub 71 rotatably secured to segment 65, and is swively connected at its end to stub 72 on strap 58. A link 73 connects segment 65 to arm 55 and is pivoted at 74 to the segment 65 and at 75 to arm 55. As arm 55 and cam 52 are each rigidly secured to shaft 53, the adjustment between segment 65 and strap 58 will adjust the angular relationship of arm 55 and strap 58.

A U-strap 76 of spring material is secured at one end to shaft 56, and at its other end is frictionally and pivotally secured a pen arm 77, which carries a suitable fountain pen at its end. As shaft 56 is rotated by the pressure element this pen is actuated by the pressure element to trace a pressure record on chart 78 which is rotated by clockwork (not shown) or in any other suitable manner. As the limit of movement of pen arm 77 is fixed by prior practice with respect to chart sizes the pivotal movement of cam 52 which is connected by a linkage to shaft 56 must be correspondingly limited.

The cam 52 (Figure 6) has its edge marked by five division marks, 0, ¼, ½, ¾ and F, the mark F defining the high pressure limit of angular movement of the cam and the mark 0 representing atmospheric pressure, and the inner marks divide the cam into four aliquot parts. As shown, these parts are equiangular, but in other types of cams these parts may be equidistant. The cam 52 is designed so that its radial recession and angular movement are directly proportional to the gauge pressure. In order to reduce the angle of contact between the knife edge 51 and the edge of the cam, the relation of clutch arm 48 to the cam is such that when the cam is moved to where the knife edge is in contact with the ½ position the arm 48 is horizontal. This is clearly shown in Figure 5. By so centering the movement of the cam the angle of contact between the knife edge 51 is reduced to a minimum and slippage is eliminated. If desired the cam edge can be milled to further eliminate slippage.

The theory of the calibration of the pressure corrector is as follows: When gas is being delivered at the base pressure the counters 29 and 30 should advance at the same numerical rate. With a given gearing ratio in counter 30 and a proper adjustment of the downward limit of the stroke of clutch arm 48, the limited angular movement of clutch arm 48 will register on counter 30 the same as one complete revolution of gear 26 registers on counter 29 at the base pressure.

Or mathematically stated by Boyle's law, the volumes of gases at different pressures are inversely proportional to their absolute pressures, this law being expressed by the following formula $$(1) \quad C = \frac{P_A + P}{P_A + P_b}$$

where $P_A$ is absolute atmospheric pressure, $P_b$ is the gauge base pressure of delivered gas and P is a given gauge pressure. When P becomes equal to $P_b$, the multiplier C becomes 1. If the downward limit of movement of clutch arm 48 is set to correspond to absolute pressure then when the cam 52 is moved to coincidence with knife edge 51 at a point on the cam corresponding to the base pressure, the two counters will advance at the same numerical rate.

For obtaining proper adjustment of the absolute zero point the procedure is as follows: The linkage between the cam 52 and pressure element 60 is adjusted so that when the pen 77 shows zero gauge pressure the zero mark on the cam and knife edge 51 of arm 48 coincide, and when the maximum pressure is shown by pen 77 the knife edge coincides with the mark F on the cam. Counter 29 is carefully set to a definite position, the graduated collar 25 in conjunction with an index mark on the glass cover (not shown) permitting accurate setting, and the reading is noted. The set screw nut 43 is now released, and the adjusting screw 44 is turned to approximately the position required to provide for proper limit of the downward movement of extension 47 at the absolute zero position E which drives the clutch arm 48.

Upon each downward stroke of lever 32 the extension 47 engages arm 48 at the specific setting of the cam, and moves the arm 48 downward until the absolute zero position is reached, which is the downward limit of the stroke of arm 32 and arm 48 driven thereby. As the two counters 29 and 30 should register alike when the cam is at base pressure, it is apparent that when the cam is at atmospheric pressure the corrected counter 30 should register less than uncorrected counter 29, depending on the particular base pressure selected. If the base pressure is selected at .25 lbs., the value of the constant C in equation (1) becomes $$C = \frac{14.4}{14.4 + .25} = .9828$$

That is, when the uncorrected volume counter advances one thousand units the corrected counter should advance 982.8 units if the adjustment of the limit of the downward stroke of lever 32 and arm 48 is correct. If not, the lower terminus of the stroke of arm 48 is changed and the test is repeated. By repeated tests the stroke of arm 32 is finally adjusted.

For a maximum fifty pound gauge pressure cam the value of C in equation (1) becomes $$(2) \quad C = \frac{14.4 + 50}{14.65} = 4.396$$

when $P_a$ equals 14.4 lbs. and $P_b$ equals .25 lbs., so that the advance of register 30 should be 4396 when counter 29 advances 1000. If the reading of counter 30 is not the same as this figure this may be due to the fact that the angular movement of cam 52 is not correctly proportioned to the angular movement of shaft 56. This proportion can be varied by the adjusting screw 69. Turning screw 69 in one direction decreases effective radius 56—74, while turning in the opposite direction increases this radius, thereby varying the ratio of angular movement of strap 58 and cam 52 as desired. As adjustment of screw 69 will move the cam zero with relation to the pressure coil zero, the screw 63 is turned to rotate strap 58 about shaft 56 to compensate therefor, so that when no pressure is applied to the pressure element 60, the zero mark on the cam and knife edge 51 will coincide. At the higher pressures it is important to compensate for deviation of gases from Boyle's law, and this compensation can be made by using a properly shaped cam, or by suitable adjustment of screw 69. By turning screw 69 to decrease the length of radius 56—74 a suitable amount, the device is compensated for gases whose pressure-volume curves are below the curves for perfect gases. The correct amount of turning of screw 69 is determined by test.

After the zero and maximum pressure positions of the cam have been checked an added check can be taken on the intermediate positions. For example on a fifty pound pressure range the ¼ graduation corresponds to 12.5 lbs. gauge, and ½ graduation to 25 lbs. gauge, etc. By applying a suitable pressure these intermediate positions can be checked in a similar manner. However, generally it is necessary only to check the absolute zero position at the base pressure and at the maximum pressure limit of the cam. By using the angular markings 0, ¼, ½ etc. and a mark corresponding to the base pressure on the cam, once the instrument is calibrated, it becomes unnecessary to check the apparatus by applying a known pressure. In such case a pressure can be applied sufficient to bring the base pressure mark into coincidence with the knife edge 51, and the counters 29 and 30 can be checked as previously described.

For testing and proving the pressure correcting device the valve 4 is adjusted to maintain a predetermined operating pressure in the meter 1 ahead of valve 5, and valve 5 is adjusted to maintain the base pressure in outlet pipe 3. From the known characteristics of the orifice plate 7, the barometric pressure and the temperature of the gas, the volume of gas at the base pressure flowing through orifice or flow prover 7 in a given time can be calculated. This can be compared directly with the observed advance of corrected index 30. If both the positive meter and the correcting device are accurate the volume as calculated from the above data should correspond to the volume as indicated by the corrected index.

If there is a substantial discrepancy between the volume computed by the low pressure orifice method and the volume indicated by the corrected index, in many cases it is possible to correct the error by using adjustment screw 44 or adjustment screw 69 of the correcting device, although the error may be not in the correcting device itself but in the positive displacement meter. Thus, it is possible in a simple manner to correct for inaccuracies of meter 1 in the field without having to correct the meter itself. Also, errors due to departure of the gas from Boyle's law can be corrected by suitable adjustment of screw 69 to cause the counter 30 to register correctly.

The method of testing and calibrating is not limited to the specific apparatus herein disclosed. The apparatus provides a simple quick and easy way to calibrate the pressure correcting meter, and can be used with facility in the field or in the laboratory. The invention may be embodied in other specific forms without departing from the spirit or essential characteristics thereof. The present embodiment is therefore to be considered in all respects as illustrative and not descriptive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of proving and testing a positive meter having a pressure correcting device including corrected and uncorrected volume counters driven thereby, which comprises, passing gas through said positive meter at an operating pressure above the base pressure, reducing the pressure of the gas discharged from the positive meter to the base pressure, determining the volume of gas at the base pressure and comparing the determined volume of gas with the corrected volume counter.

2. An apparatus of the character described comprising a positive meter having a pressure correcting device driven thereby including corrected and uncorrected volume counters, means for passing gas through the positive meter at an operating pressure above a base pressure, means for reducing the pressure of the gas discharged from the positive meter to a base pressure, and means for determining the volume of gas discharged from the positive meter at its base pressure.

ALLEN D. MACLEAN.